(12) United States Patent
Samid

(10) Patent No.: US 10,445,730 B2
(45) Date of Patent: Oct. 15, 2019

(54) DIGITAL TRANSACTIONAL PROCEDURES AND IMPLEMENTS

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 336 days.

(21) Appl. No.: 15/293,352

(22) Filed: Oct. 14, 2016

(65) Prior Publication Data

US 2017/0039556 A1    Feb. 9, 2017

Related U.S. Application Data

(63) Continuation-in-part of application No. 14/035,921, filed on Sep. 24, 2013, now Pat. No. 9,471,906.

(60) Provisional application No. 61/744,277, filed on Sep. 24, 2012.

(51) Int. Cl.
| | |
|---|---|
| *G06Q 40/00* | (2012.01) |
| *G06Q 20/38* | (2012.01) |
| *G06Q 20/06* | (2012.01) |
| *G06Q 20/40* | (2012.01) |
| *G06Q 40/04* | (2012.01) |

(52) U.S. Cl.
CPC ......... *G06Q 20/3825* (2013.01); *G06Q 20/06* (2013.01); *G06Q 20/065* (2013.01); *G06Q 20/40* (2013.01); *G06Q 40/04* (2013.01)

(58) Field of Classification Search
CPC .............................. G06Q 20/065; G06Q 20/36
See application file for complete search history.

(56) References Cited

U.S. PATENT DOCUMENTS

| | | | |
|---|---|---|---|
| 2004/0171406 A1* | 9/2004 | Purk | 455/558 |
| 2006/0225142 A1* | 10/2006 | Moon | G06F 21/6218 726/34 |
| 2007/0215689 A1* | 9/2007 | Algiene | 235/379 |
| 2007/0244812 A1* | 10/2007 | Turk et al. | 705/39 |
| 2008/0262969 A1* | 10/2008 | Samid | G06Q 20/04 705/64 |
| 2010/0088231 A1* | 4/2010 | Eugenio | 705/44 |
| 2012/0239580 A1* | 9/2012 | Al-Herz et al. | 705/75 |
| 2015/0081462 A1* | 3/2015 | Ozvat | G06Q 20/027 705/21 |
| 2018/0004980 A1* | 1/2018 | Kuczynski | G06F 21/87 |

\* cited by examiner

*Primary Examiner* — Mike Anderson

(57) ABSTRACT

This invention describes a set of related procedures designed to co-operate with mints of digital money in order to allow for said money to be properly, securely, and conveniently traded by, various size and various type of trading crowds. The procedures refer mainly to distribution of responsibility. This invention also specifies the construction of digital coins encapsulated in a physical housing to amount to off-line tradable digital coins.

3 Claims, 8 Drawing Sheets

Tamper-Proofing a Drainable Hybrid Coin (a) light sensor - erases the money bits when light is detected
(b) pressure sensor – erases the money bits when the preset pressure in the enclosure is changed above a preset threshold
( c) an emitter of a well-defined range of electromagnetic radiation
(d) a radiation sensor that erases the money bits when the reading changes above a preset threshold
(e) the hybrid coin enclosure Anatomy of Hybrid Coin Payment Environment appearance of a hybrid coin Cracked Hybrid Coins

Drainable Hybrid Coin (Elements)

(a) money value bits
(b) meta bits (non money value bits)
( c) payment circuitry system (PCS)
(d) coin erasure circuitry
(e) payment port
(f) tamper resistance (secure) enclosure

Fig.-7

Tamper-Proofing a Drainable Hybrid Coin

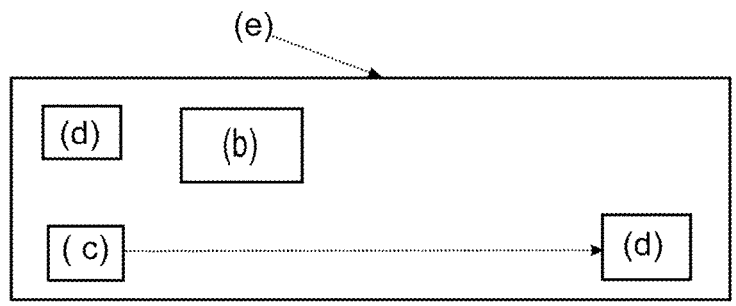

(a) light sensor - erases the money bits when light is detected
(b) pressure sensor – erases the money bits when the preset pressure in the enclosure is changed above a preset threshold
( c) an emitter of a well-defined range of electromagnetic radiation
(d) a radiation sensor that erases the money bits when the reading changes above a preset threshold
(e) the hybrid coin enclosure Fig.-8
"Pizza" Coin
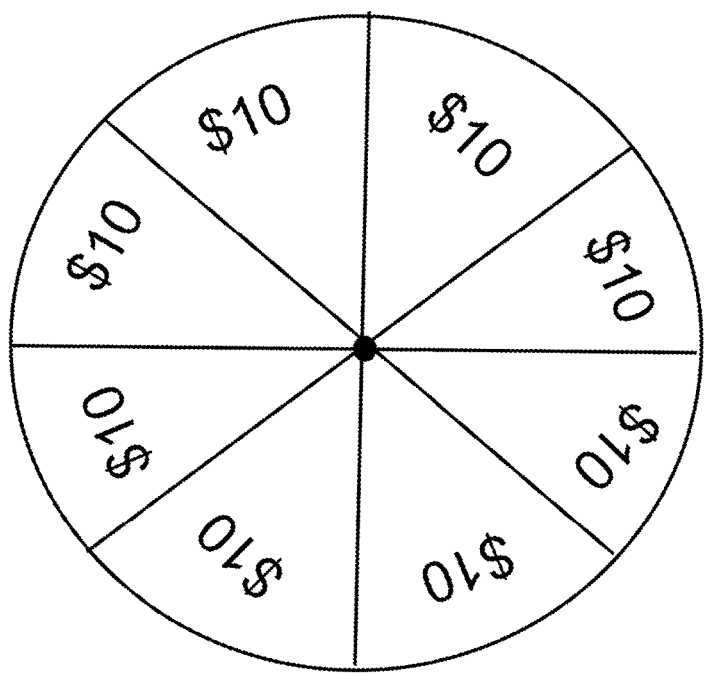
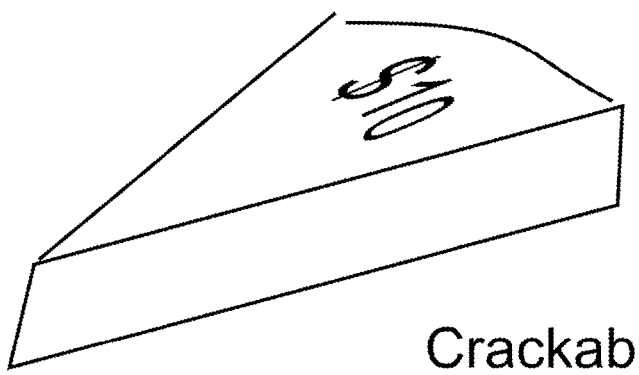
Crackable
"pizza slice" coin

DIGITAL TRANSACTIONAL PROCEDURES AND IMPLEMENTS

BRIEF DESCRIPTION OF DRAWINGS

FIG. 7: Tamper-Proofing a Drainable Hybrid Coin: Illustrating various security measures: (a) a light sensor that is designed to be activated in the event that the otherwise darkened internal environment is flashed with light as a result of drilling a hole, or cracking the enclosure. Once activated the coin erasure circuitry is activated and wipes out the coin content; (b) is a pressure sensor that is triggered when the pressure inside the enclosure changes beyond some preset threshold—either for higher, or for lower values. The pressure sensor may be applied for the case of creating a vacuum in the enclosure and upon drilling or cracking the internal pressure returns to normal, or in the case where the set pressure in the enclosure is higher than atmospheric, and upon drilling or cracking the pressure comes down to normal. Once activated the coin erasure circuitry is activated; (c) is an emitter of electromagnetic radiation that is fired across the internal volume of the enclosure to be captured and metered at the other end (d) where the level of radiation absorption is being monitored. Any tampering and exposure of the enclosure (e) to the outside environment will result in a change in the gaseous composition of the internal volume, and a consequential change in the rate of radiation absorption—such change will trigger the erasure circuitry to wipe out the digital coin within the enclosure. The absorbing cocktail will be kept a secret to make it intractable for the assailer to beat this defense.

FIG. 8: Pizza coin: an illustrating of one of many decorative ways to present, a gift, say, of electronic cash. In the illustration 8 coins are built as pizza slices that fit to be a complete pizza. The money in each such crackable coin is the same: $10, but it could be different. This alludes to the many creative ways in which crackable hybrid coins can be configured, while still maintaining their utility.

DETAILED DESCRIPTION OF THE INVENTION

Figure 1:
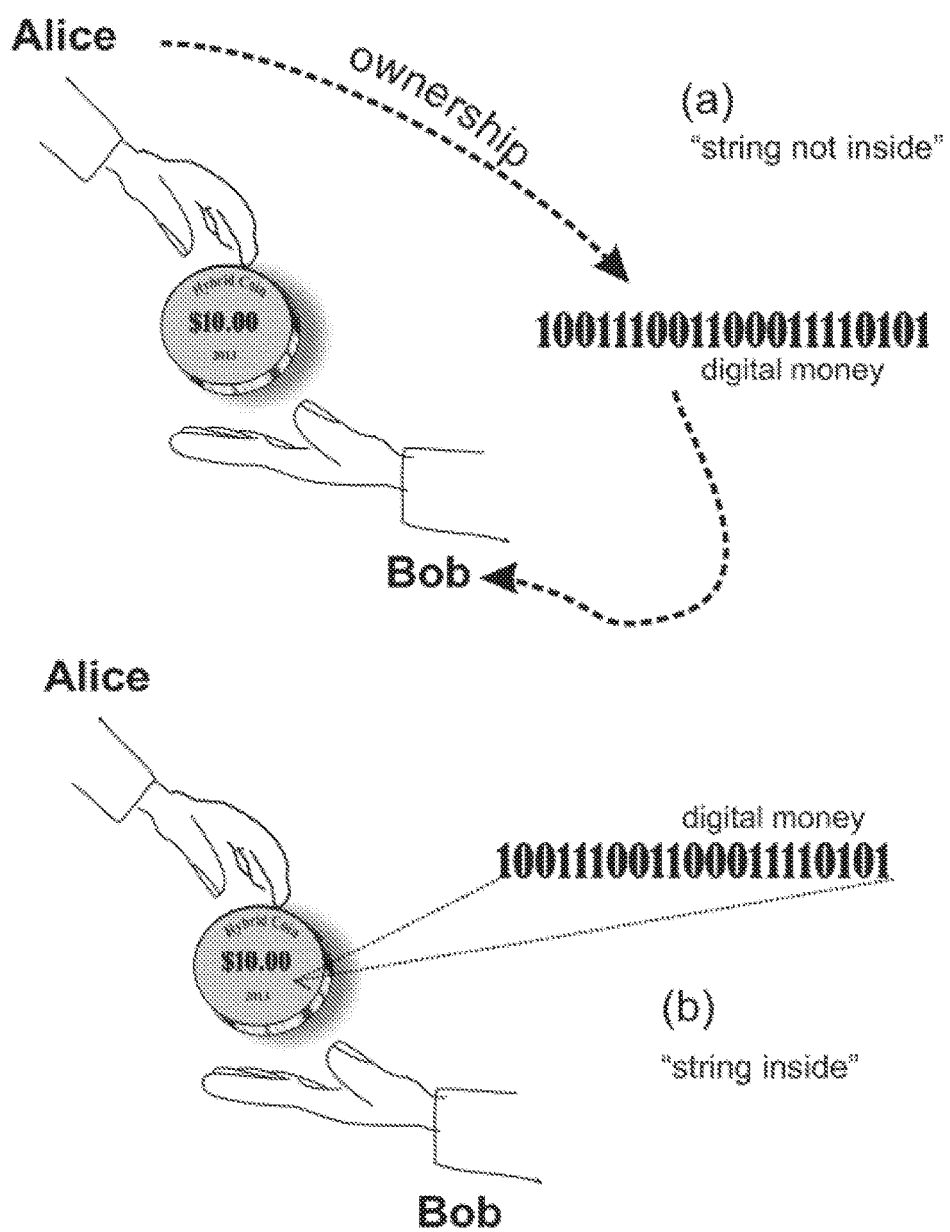
FIG. 1: string inside and string outside trading options for hybrid coins.—demonstrating the distinction between passing a string that is contained inside a hybrid coin, and a string that is without. In part (a) Alice passes the hybrid coin to Bob, which corresponds to cloud-based accounting action: transferring the coin denomination value from Alice's account to Bob's account. In part (b) Alice also passes a hybrid coin to Bob. This time the coin contains the digital money inside itself. There is no corresponding account transfer anywhere.

The invention is described in two parts:
1. Mint Array Design (Core Mint v. Front Mints)
2. Hybrid Coins

1. Mint Array Design

The Core BitMint projects to any number of front BitMint entities, and the relationship may be one or a mix of the following:
Royalties Payment
System
Dead Coins
Live Coins Each front mint may take the role of the Core, and project to its own front entities. In this way one may define a mint-tree (hierarchy).

This relationship will allow front mint to be consistent with parameters and regulations prevailing in their domain, while enjoying technical and functional support from the Core BitMint.

Royalties Payment:

In this mode Front BitMints pay use royalties to the Core for using its technology, and no further relationship or obligation exists.

System:

In this mode the Core delivers, installs, and provides training and maintenance to the front—or any part of this list. In its full implementation the Core provides a ready-to-mint system, maintains it, and trains its operators.

Dead Coins:

In this mode the Core delivers to the front valueless minted-coins per the front request. The front would then 'charge' these dead coins, and 'bring them alive' versus its customers. It would be the Core responsibility to insure the integrity of the bits and their identity, and to equip each coin with the headers and trailers as needed. The Core would identify the core mint, the front mint, any other parameters requested by the front, and then add, say, as trailers, any cryptographic parameters as needed.

Live Coins:

In this mode the Core will deliver live, charged coins to the front mint. The front mint will pay, or promise to pay for these live coins, and then, if necessary, process these coins to serve for the purpose of the front.

The responsibility and involvement of the Core with the business of the front entities is minimal in the royalties mode, a bit greater but still limited in the system mode, also limited in the dead-coins mode, and the highest in the live-coins mode.

In the system mode the Core is responsible for the integrity of the delivered system, but not for its use. In the dead-coins mode, the Core is responsible for the quality of the bit identities of the coins, but not for its money value or use. In the live-coins mode the Core is responsible for the money value of the coins. This responsibility may be of two categories:

front-limited
front-extended

In the front-limited mode the Core has a contract with the front whereby the front pays or promises to pay for the delivered coins, and the Core agrees to redeem these coins when submitted by the front for redemption. The Core will not be involved in any business arrangement between the front mint and its customers, and will not interact with those customers. In the front-extended mode the Core will interact with the customers of the front, even directly redeem its coins to them.

Basically, the idea of live coins, is to alley the customers apprehension with regard to the trustworthiness of the front mint. The live-coins setup will give the front customers the peace of mind that their money is kept the trustworthy Core.

For example, customers may be reluctant to trust their money to an unknown Front company that offers them money transfer, micropayment, charity contribution, etc. However, if the terms of the coin are such that if the Front does not pay, or goes out of business, the coin can be redeemed at the Core.

Buffer: Layered Mint Operation

It may be advisable to construct a buffer between the entity that mints the coins and the entity that trades them with the public (its customers). Such in the case in the "live coin" Core-front business setup. A buffer will allow a Core mint to mint coins that may either be traded as is by the front mint (in this case this entity is not much of a mint), or it may be first processed by the front mint, with both the header and trailer possibly adjusted, added-to, to serve the purpose of the front. The value bits will be minted by the Core based on the Core's recognized trustworthiness. For example the front could add cryptographic parameters to the trailer.

Illustration: the add-on header information (added by the front) will include payment terms according to which the Front will redeem the coin in favor of its customer. The trailer add-on may contain a signed hash to identify the coin as re-minted by the Front.

Bit-Masking Trade Tracing

This procedure is based on the notion that a BitMint coin is constructed from a large number of ordered bits. So much so that anyone who knows the identity of, say, 80% of the bits is not likely to have guessed it right but is overwhelmingly likely to have been given the bits. Accordingly Alice could pass a BitMint coin to Bob, and mask the identity of a small number of bits, say, selected randomly. Bob will have knowledge of the identity of sufficient number of bits to claim that he is in possession of the coin, but the identity of the masked bits will connect Bob to Alice, as the payer of the coin. If Bob had received the coin from Carla, then it is virtually impossible for Carla to randomly select the very same bits as Alice for the purpose of masking their identity as she passes the coin to Bob. Hence the identity of the masked bits points to the source of the coin. Bob, on his part may pass the coin to David—masking some additional bits. The identity of the bits that Bob masked will point to him as the source of the coin. And so on, when David passes the coin to Eve he masks some more bits. And on it goes. If Alice will examine a coin held by Eve she will be able to determine that it was a coin she held because the bits that she masked giving the coin to Bob are all masked. And since the number of masked bits is so small compared to the number of bits in a coin, the chances that all of Alice masked bits are masked by someone else are very slim.

The selection of bits to mask may be done via a selection algorithm that takes into consideration any information on the coin, its value bits and all the other coin information (header and trailer). So for each coin the selected bits are different, but given a coin the selection algorithm may be readily replayed.

If an approval hierarchy is used then it is advisable that the number of masked bits is smaller than the number of masked bits between layers on the approval tree.

Samid cipher cipher U.S. Pat. No. 6,823,068 may lend itself to RFID technology. The key may be hard-wired as matrix of bits where every two bits represents one of the four letters: X, Y, Z, and W. The cipher will operate on basic knowledge where the plaintext comprised of a non-repeat series of X, Y, Z and W letters guides a traveling path on the key, and produces a traveling trace marked as a sequence of Up, Down, Right, and Left. The stream comprised of U, D, R and L letters will constitute the ciphertext. The plaintext may be hard-wired, firmware, or software. Upon triggering from the outside the plaintext will be fast processed through the key (the matrix) to yield the ciphertext as output. Conversely, the ciphertext may be resident in the RFID, and upon initialization, the ciphertext will be processed via the key (the bit matrix) to yield the plaintext as output. In both cases the Samid cipher will be implemented.

There are various uses for this arrangement:

Hiding content of the RFID: an RFID tag may contain information that needs to remain private. In a regular ID any reader would activate the RFID and read the information in it. That information may be encrypted and be interpreted through an exhaustive look-up table. But an easier alternative is to fit the secret RFID information as software, firmware or hardware in the tag, and refer to it as plaintext. The Samid key will such that the size of the output ciphertext will be much larger than the size of the plaintext. And also there will be a great deal of degree of freedom for the encryption process to yield any of a large variety of ciphertexts, all of them decrypt back to the same plaintext, if the decrypter has possession of the right key.

So, in this arrangement only the key will have to be known to the reader of the RFID, and a large number of related or unrelated RFID tags will be sharing the same key. Each tag will contain some specific and unique content. Upon activation, reading, the content will be processed through the Samid cipher key, and yield an output to be read by the decoder/reader. The reader will have the key in its reading device, and will be able to instantly decrypt the ciphertext, and display and interpret its contents. An unauthorized reader, will activate the RFID, but will be unable to interpret its output because of not having the key.

What is more: the size of the ciphertext will vary, and so the hacker will not be able to conclude from the size of the ciphertext, how much contents (plaintext) is stored in the device. Also the activation will be able to include random data from a clock or from the environment, and that data will guide the encryption each time to a different ciphertext, a further difficulty for the cryptanalyst.

Similar setup could be done with Flash technology. A flash memory may contain a content X (may be a digital money string or anything else). The device that holds this memory card, activates the device, so that X is encrypted via a well defined firmware, say key, and produces Y. A verifier attests to the presence of X in the drive on account of detailed examination of Y.

AutoKey Authentication

Alice holds string X, and wishes to signal and prove that holding to Bob. If she sends X in the clear, Eve, the eavesdropper will catch it. If she had a shared key with Bob she could use it to encrypt X and send it to Bob. Otherwise she could use diffie Hellman or any other cryptography between strangers—with all the weaknesses thereto. So instead she could use an Auto-Key, based on the cryptocipher and crypto addition presented by this inventor before. Accordingly Alice will separate from the string t bits as described in the crypto cipher, use these bits to find where to dissect the rest of the string, and then use one part so dissected as plaintext and the other as a Samid cipher key. Then Alice will encrypt the plaintext using her derived key applying the Samid cipher. She will communicate the result to Bob the verifier. Bob who knows X will repeat Alice process to check if Alice ciphertext agrees with his calculations, and if so, he is rest assured that Alice has X. This verification happened without any exchange of any key. Eve, the hacker will not be able to reverse Alice ciphertext, Y to the original string because as it has been shown there, there are infinite number of strings that process to the same Y.

2. Hybrid Coins: Off-Line Digital Money

Gideon Samid, Provisional Application US PTO
61/724,916 Nov. 10, 2012

Digital money is native to online applications, and inherently problematic in off-line circumstances where one suspects that the same digital string was used earlier, elsewhere, or even later, putting the payment in doubt. We propose effective means to manage such risks and operate a viable off-line digital payment solution. The central concept is that of a 'hybrid coin' or say, a 'dynamic coin'—a physical device containing, dispensing, and in some cases, accepting digital cash. The device, the coin, will be tamper-resistant to a degree commensurate with its capacity. Security will be safeguarded by insuring that the cost to counterfeit exceeds the maximum money content of the coin. Different coin denominations will have different tamper-resistant measures, and these measures will be dynamically adjusted to protect against increasingly more sophisticated counterfeit measures. The use of the coins will be either via the regular hand-over, or by 'draining': namely, one could pass to the payee a bunch of coins trusted for their declared money content, or one would connect the coin to a recipient device, and drain, pay off a portion of the stored value. We distinguish between the following coins: (1) "gold coins" which are minted by digital currency mint, and their seal is intact, indicating they were never bled, drained, and hence satisfying the recipient that these coins carry their nominal (mint stamped) value. (2) "silver coins" which are gold coins that have been partially used (drained), and now contain less money than the originally minted amount. (3) "bronze coins" which have been drained, or bled, but which have also be replenished from another coin. The coins are optionally battery operated, marked by a unique serial number, and they may be shaped like regular coins. The digital money in the coins can be defined in terms of dollars, Euros, Yuan, or any other currency, as well as defined against gold, or any other commodity valuable. Hybrid coins may be uploaded to online use, and altogether facilitate an important facet of normal civil trade practice. Hybrid coins provide continuity of habit relative to regular coins, and respond to every day functionality needs. Hybrid coins may also be found useful in mass emergencies, when power lines are down, communication networks collapsed, and off line payment is the only way.

INTRODUCTION

There are several solution options for online digital money. Yet to prevail in the marketplace it seems necessary for a solution to be extendible to off-line circumstances. For centuries people have been paying each other by handing over a physical token, a representative of value. For behavioral continuity this is a must. In practice there are two categories of situations where the off-line payment option is critical: (1) immediacy and simplicity, and (2) emergency—short-lived, or durable. Nothing electronic, or computer-based can compete with the immediacy and simplicity of hand to hand coin transfer. In many daily circumstances resorting to an electronic gadget, having to punch buttons, and having to participate in a person-machine dialogue, is too much of a burden. Electronic transactions inevitably rely on electric power supply: be it a battery, or be it the grid. Both may be interrupted, impaired and become dysfunctional—disabling payment altogether. Our modern societies are comprised of very crowded urban areas where millions of strangers share a territory and public resources, and a payment mechanism is the only way to get such a crowd into a mutually beneficial cooperation. We cannot risk the loss of the payment option, exactly when it is needed most.

We conclude then that we must allow for a seamless back and forth motion between the online payment mode and the offline payment mode, and the concept of Hybrid Coins proposes a solution for this challenge.

Let us first define and characterize digital money.

Digital Money is money that expresses its value via digitized data in a medium-un-tethered fashion. Since all data can be reduced to an equivalent binary string, we can further narrow the definition to say that digital money is money that expresses its value via a bit string, or, say a 'binary string' where the identity of the string bits {0,1} carries the monetary value regardless of the medium through which these binary digits are written or expressed.

The logic, mechanism algorithm or concept that associates a given binary string with a monetary value is of no importance for our matter herein. A hybrid coin should extend to off line payment any digital money solution where a bit string represents value, regardless of the concept, formula, logic, mechanism that establishes the value of the string.

The Hybrid Coin Concept

A hybrid coin is a physical device that by handing it over, one carries out a payment corresponding to the face value of this device, where the face value is reflected by a bit string that changes ownership from the payer to the payee as the coin is handed over. Ownership is expressed as 'the right to use, dispose, pass-on this string as the owner sees fit.

According to the above definition the bit string—the digital money—does not have to be inside the coin, or passed along with the coin. All that is needed is for the ownership of the associated bit string to be exchanged between payer and payee. Obviously, if the coin contains the string, the ownership passes on. In the "no-string-inside" option the coin may serve as "proof of ownership" which can be used in some subsequent protocol in which the money is actually transferred. FIG. 1(a) depicts the "no string inside" option, and FIG. 1(b) depicts the "string inside" option.

In FIG. 1(a) "no string inside: Alice passes to Bob a $10.00 hybrid coin, and this act confers a transfer of ownership of a bit string that resides in the clouds of elsewhere outside the coin. As the coin is transferred from Alice to Bob, the respective ownership of the corresponding bit string is also passed from Alice to Bob. Passing the string from Alice to Bob, does not necessarily erase the string from Alice memory. This leads to the fundamental issue of double spending, namely Alice, by mistake or by fraudulent intent may re-transfer ownership to the same bit string to a third person, thereby violating the association between the bit string and the socially accepted sense of value. Since the bit string represents value in the context of some comprehensive solution to digital currency, we may assume that the issue of double spending is resolved and taken care of in the context of that solution.

FIG. 1(b) "string inside" represents the case where the physical device, the hybrid coin, contains the digital money, and hence, the passing of the coin amounts to passing the string—the money itself.

A string-inside hybrid coin is produced and manufactured, and also optionally distributed by an entity referred to as the mint. The mint assumes the responsibility to the monetary value of the coin it issues, mints.

In addition to the standard hybrid coins described above the mint may wish to construct: (1) empty coins, and (2) networked coins. Empty coins are simply bit-money containers that may be filled with bit-money by traders to dispose of them at a later time either by feeding their bits to a payee or by passing the coin to a trusting payee. Networked coins are hybrid coins with a phone-like connection to networks. Such "live hybrid coins" may have their contents instantly, and continuously verified by the continuously connected mint.

String Inside Hybrid Coin

The string-inside case may be categorized as follows: (1) Gold coins: a pristine, virgin coin that has not been broken-into, meaning not 'opened', nor tampered with, relative to the state in which it was issued by the mint. (2) Silver coins: a gold coin that has been worked on, and its inside money string was at least partially exposed; (3) bronze coins: a silver coin to which a money bit string has been inserted from a source other than the mint.

Gold coins are transacted on account of the evidence of the authenticity of the declared mint, and on account of their virginity, namely by convincing the payee that the handed-over coin has not been tampered with since it was minted, and hence its declared face value is inside the coin with the full faith of credit attached to the mint itself. The evidence of virginity may be 'self evident'—judged by simple visual inspection, or it may be instrument based—verified by a testing device relying on scientific principle that is used by the coin. A combined measure is also possible.

A silver coin may be totally drained, and hence worth nothing, or it may be partially drained, and in that case a reader may be needed to establish its residual value, and confirm that the digital money still there is indeed the original money put there by the mint, and not a refill from an unknown source.

A bronze coin will also need a reader to read the digital money residing in the coin, but in addition the payee will require means to authenticate the present string as its source may be questionable.

Silver coins must be born from gold coins, and 'give birth' or transform into bronze coins, but bronze coins don't have to have silver status ancestry. A trader could construct his own bronze coin, and fill it with digital currency on his or her own. If the coin is characterized and identified as 'bronze' then the recipient would not care whether the coin originally was a gold coin, or it started as a bronze status. The security implications are the same. The mint might issue 'empty coin'—which are essentially empty containers for digital currency, expecting the trader to fill us these containers on his or her own. In this case the mint will have no liability as to the ill use of such coins by fraudsters.

The reader of contents for each hybrid coin may be built into the coin, and the result is electronically computed in the coin itself. In that case the present value of the coin may be communicated electronically to an electronic device with which the coin communicates, and/or it may be displayed on the coin for the payee to read without any instrument. The reading circuitry of residual value will have to be trustworthy and tamper resistant.

String not Inside Hybrid Coin

In this mode possession of the coin, once verified by the authority that manages the bit money string, will be declared as given to the holder of the coin. When the coin holder passes the coin further to a subsequent trader then the string management authority reconfirms the new holder of the coin, and registers the new possessor of the coin as the new owner of the string. A bit money string owner can redeem it, or download it, or dispose of it as he sees fit according to the operating rules of the mint.

"String not inside" may be operated mainly with gold coins. The monetary value of the string-not-inside must be commensurate with the security and trustworthiness of the technology that is used to confirm the possession of the hybrid coin that is associated with the particular string.

The advantage of the 'string not inside' mode is that payment may be conditional. A 'string inside' coin, say denominated for $100, will allow the holder of the coin to trade it as a physical object for its nominal $100 value, and will allow him to break it open, suck out its bits and use them as un-tethered cash. A 'string not inside' gold coin for the same denomination, would be clearly marked with a payment code, or say a payment condition code that would indicate to the recipient that this coin does not contain money per se, but its possession will allow one to claim the denominated sum if, and only if a set of conditions indicated by the marked code is fulfilled. The recipient then will accept the coin as a gold coin for its nominal value, if he can satisfy the payment conditions indicated by the code. (Or, if he or she believes they can trade it further to a complying recipient). The possessor of a gold 'string not inside' coin may break it up, connect it electronically to the mint—prove to the mint that the respective coin is in his possession, and when so, the mint will demand prove of satisfaction of the other payment conditions, and upon a satisfying proof, the mint will communicate the denominated sum to the claimant.

So for our $100 'string not inside' coin, once broken-in and hooked through a phone to the mint, the mint might launch a challenge-response dialogue with the coin. The coin will be tamper resistant and have a chip inside with unique data and logic to satisfy the challenge-response dialogue issued by the mint. The mint will then be satisfied that the particular coin is in possession of the claimant, and will then ask for a proof that the claimant belongs to, say, a club, by asking for a club membership PIN to be communicated to the mint, or to be demonstrated for having possession of the PIN using a challenge-response dialogue. And only when the two conditions are met, the digital money worth $100 is sent down the electronic channels for the claimant to use as cash.

Technology of Hybrid Coins

We discuss the following technological challenges:
Mint Assurance
Virginity Assurance
Silver and Bronze Corns Value Determination
Construction technology In each case the technology will have to correspond to the denominated value of the coin, aiming to insure that the cost to counterfeit or violate the coin will be at par or more with its denominated value. Coins with large denominations will allow for more expensive technology.

Unlike the case with ordinary coins, hybrid coins allow the mint to (1) monitor counterfeit activity, and (2) effectively fight it strategically. Coins may be minted with a built-in expiration date. By that date the coin will have to be cracked open, and its content redeemed. This will expose the number of coins that circulate while being counterfeit. Also, if a major counterfeit action happens, the mint can wholesale invalidate the type and denomination of the violated coin, and ask owners of such coins to redeem them electronically by breaking them up, and testing the validity of the money within. This can be done in combination with a strategy of manufacturing the coins with expensive machines that become economical only for large quantities. Counterfeiters will also have to invest in expensive counterfeit machinery, which will become useless the moment the mint invalidates that type of coins.

Mint Assurance

Traders need to be assured that the coin they trade with was manufactured by the mint, and not by a counterfeiter. For that reason any hybrid coin will come embossed or written with a serial number, allowing a trader to verify the coin. Naturally verification will occur more frequently for high denomination coins. The mint will use technology to create confidence about its coins. The mint assurance technology will be of two kinds or combination: (1) visible measures, (2) device tested measures. The mint might use embossing, imprinting, type-casting, and exotic materials to make it difficult to copy and counterfeit. The higher the denomination, the greater the measures of visible uniqueness. The mint may also embed indicators that would require an inspection device to probe. The device tested technology might be based on electromagnetic phenomena, or on chemical reaction.

As an example the coin may be covered with color changing plastic that changes its color upon shining on it with a special range of electromagnetic radiation. This technology is used in sunglasses that become dark upon sunlight, and return to sheer status in room situation.

Various holographic techniques can be used to build a sophisticated coin that will frustrate amateur counterfeiters, and all others except top professionals, and will also require the counterfeiter to counterfeit only high denomination coins.

A simple mint assurance will be given by the serial number and minting date imprinted on each coin. A recipient trader will be able to text the serial number and date to the mint (or pass it on otherwise), and the mint will respond either with an authentication—yes, such a serial number corresponding to the sent date is a the serial number and a date of a valid coin. It is not a very good assurance, of course, but it has some base value.

One special way to provide mint assurance is the cryptographic window method. See below.

The above address the issue of mint assurance—assurance of authenticity of the coin as being issued by the declared mint—with respect to Gold coins. Once opened, broken-in, the assurance of the mint will be taken care of through the electronic exchange with the computing device that would be connected to the coin. There are various common cryptographic means to assure the validity of the declared manufacturer of a device. Such 'silver coin mint assurance' is a different challenge from the 'gold coin mint assurance'.

Cryptographic Window Mint Assurance:

This method is more attractive for high denomination gold coins. The gold coin is fit with a dynamic display window, LCD or similar display technology. The small display will feature some sequence of alphanumeric characters based on some cryptographic protocol. The recipient of the coin will communicate to the mint the serial number of the coin, and the current display string. The mint will respond with an OK, if the communicated display string is the expected one, and "not-ok" otherwise.

This crypto window may be implemented using any of the prevailing techniques used by hardware devices that compute keys, display them and change the display every 60 seconds or so. Such devices are used to authenticate a user to an approached bank, and they could also be used to authenticate a coin, especially of high denomination.

The coin so fitted will have two separate electronic circuitry. One is the circuitry that is used once the coin becomes silver, and is communicating value and money transfer with the hosting computing device, and the other circuitry will be for mint authentication as a gold coin status, with virginity intact.

The mint assurance circuitry can easily be implemented using hardware oriented cipher, like a typical LFSR stream cipher, or the cipher described in U.S. Pat. No. 6,823,068. Every so often the time count by a built in clock will be used as plaintext, and the corresponding ciphertext will be displayed on the crypto window. The coin recipient, or say, the coin verifier, will text the code to a mint number, and get a text back: OK, or not-OK, status because the mint will know from the serial number what is the tamper-resistant key in the coin and compute the corresponding display (ciphertext).

Any other mechanism where the coin will display a seemingly random display that changes frequently enough, will serve as a means to assure the identity of the mint.

Virginity Assurance

"Gold coins" must be traded with the confidence that they are 'virgin'—unopened, unused. Virginity may be based on basic old fashioned technology of 'scratchable pads'. A simple heavy stock paper ticket will certify the denomination of the coin, and will feature a scratchable stripe. Upon scratching the stripe, the bar-coded digital coin will be exposed, and be entered via a bar-reader into a payment oriented electronic computing device. Once scratched it is clearly not virgin anymore, and no one would be fooled to regard it as such. This solution may be a bit inconvenient since it requires a bar code reader.

The pharmaceutical industry is using a variety of technologies to prove the 'virginity' of packages of medications. These wrappers etc. may be copied for assuring the virginity of coins.

Coins may be wrapped with a plastic cover fitted with a 'breaking line'. Upon a slight blow, like with a heavy book, or a small hammer, the plastic cover will break along the breaking line, and the virginity will be clearly lost. The coin exposer will then be able to connect the coin with a payment oriented computing device and use the money therein.

Silver and Bronze Coin Value Determination.

A silver coin will have to provide first mint assurance, and then "no bronze" assurance, namely assurance that the coin has not be refilled with bits, but that all the bits to represent money therein are originally minted by the mint. Mint assurance and residual value assurance will be provided through the communication protocol between the coin and the payment oriented computing device with which the coin will be connected.

One common way to provide assurance of mint and residual value is for the coin to be tamper resistant and communicate with the connected computing device by encrypting all outgoing data from the coin using a private key put there by the mint, to allow the computing device to read it using the corresponding published mint public key. There could be a large variety of private-public key pairs that are distributed and used according to denomination, date of minting, etc.

There are several common hardware solutions to insure that the file that holds the money bits of the digital currency is not a refill but an original mint-placed bits.

Bronze coins require no assurance, they simply serve as bit money container, and the validity of the money will have to be ascertained outside the coin.

Construction Technology

Figure 2:
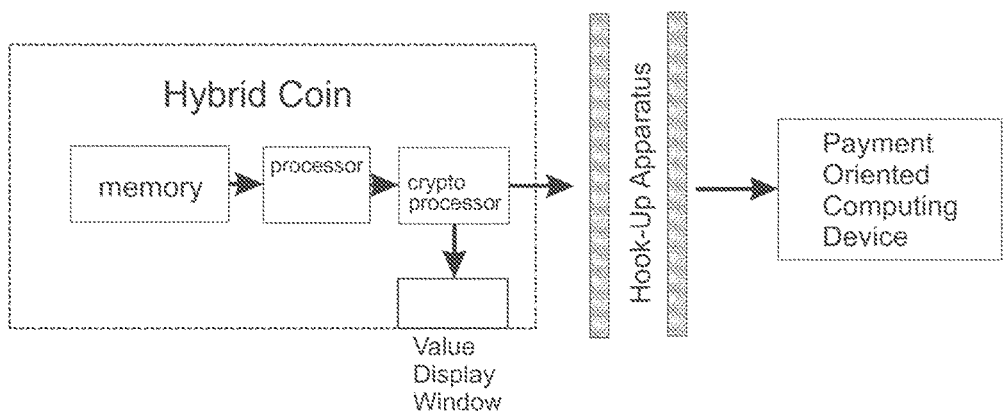
FIG. 2: Anatomy of Hybrid Coin Payment environment: Depicting the functional elements in a hybrid coin payment environment. The elements include the memory module where the digital money is written, and where it is accessible to a read/write processor module that responds to a crypto processor. The crypto processor will be connected to a display window to show the current amount in the coin. The crypto processor will carry out a dialogue protocol with the payment terminal that engages the hybrid coin, allowing for the coin to pay, or be reloaded. The hybrid coin will engage with an external payment system via a hook-up apparatus.

Construction Technology will be discussed by topics:
circuitry
power options
Hook-up technology
shape, size and form Circuitry The basic circuitry of the hybrid coin may be comprised of the following functions: memory—where the digital money is housed, a processing unit that reads/writes into the memory and optionally erases parts thereof, a value display unit that is connected to the processing unit, a crypto processor that is connected to the processing unit on one hand and to a hook-up apparatus on the other hand. The hook-up apparatus is connected to the payment oriented computing device that communicates with the hybrid coin. See FIG. 2. The hook-up mechanism may be touch-based, swipe based, or distance based including NFC, BLUETOOTH, INFRARED, WiFi, phone connection, etc. The latter are trademarks representing various means for communications based on modulating electromagnetic waves.

The coin comes with its coin data in memory. The memory may also include various mint data to help authenticate the coin itself. The crypto processor has a built in keys and operates through a variety of optional protocols, to help hinder counterfeiting. One such protocol is to encrypt all coin data that is processed by the processing unit and fed into the crypto processor, by the crypto processor, and send it out as a ciphertext. The payment oriented computing device over the hook-up apparatus will use the mint public key corresponding to the coin's private key, to ascertain that the coin is authentic.

Power Option

The hybrid coin can be power-less and operated only through the power of the device it is being hooked to. Or it can have a tiny built in battery only for the secondary circuitry to authenticate the mint, or it may have a built in battery to power up the silver operation for display of value, if such a window is presented (normally in the high value denomination coins), and for the dialogue with the hooked computing device. The battery could be replaceable and latched through a small slit at the side of the coin.

Hook-Up Technology

The coin could allow for one or more hookup options including touch hook up, nominally via a USB cable with the coin being equipped with a mini USB female port. Or with swipe option where the coin is being equipped with a magnetic card, or with a distance based communication, which is less secure.

Shape Size, and Form

Figure 3:
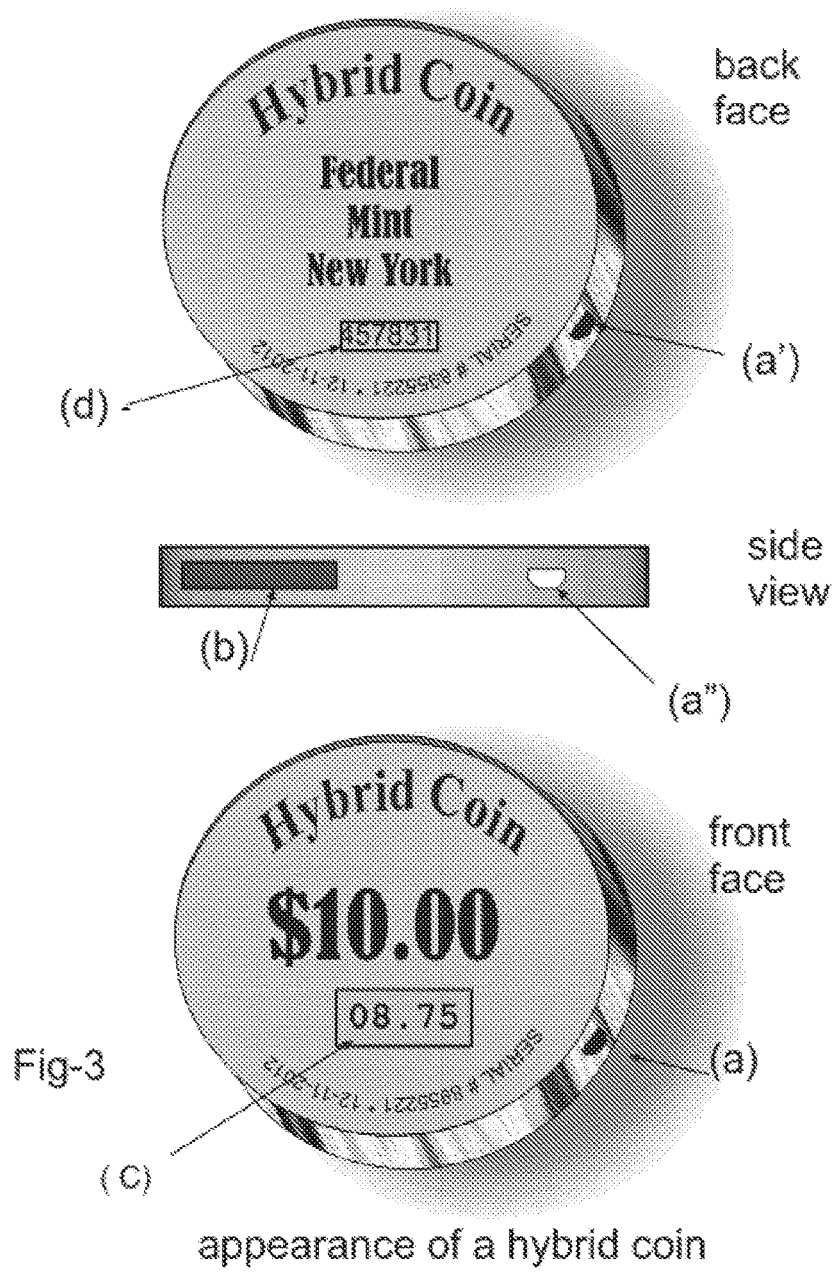
FIG. 3: Appearance of a hybrid coin: depicting the front and rear elements typical of a hybrid coin, including coin-id, and a running meter of residual digital value. Items (a,a',a') represent a mini USB female port, (b) represents the covered slot for a coin battery, (c) represents the residual value display window. In the drawing it shows $8.75, indicating that the coin has lost its gold status (lost its virginity), was already partially drained (in the mount of $1.25), and the residual value of the coin is $8.75. On the back face, item (d) represents the mint-assurance window. The display on the window changes frequently as computed by the crypto processor inside the coin

The basic hybrid coin will be round and thin, to emulate the familiar quarters or dollar coin. Its fabric will be reminiscent of a regular coin. Its edge might be jagged. See FIG. 3: items (a,a',a') represent a mini USB female port, (b) represents the covered slot for a coin battery, (c) represents the residual value display window. In the drawing it shows $8.75, indicating that the coin has lost its gold status (lost its virginity), was already partially drained (in the mount of $1.25), and the residual value of the coin is $8.75. On the back face, item (d) represents the mint-assurance window. The display on the window changes frequently as computed by the crypto processor inside the coin. That display number if computed based on a built in clock, and on the serial number of the coin, and on built-in hardware constructed cryptographic key. The recipient trader will text or otherwise communicate to the mint the serial number of the coin, and its display number, and the mint will text back whether this coin is bona fide or counterfeit because the mint will have the data in all its coins, and could follow the computation of the coin, and verify the displayed code.

Other shapes, rectangular, credit-card like will be also available. Different shapes will accommodate different options for proof of virginity and mint assurance. The round coins have the advantage of behavioral continuity.

There might be a distinction in the size of the coin based on the denomination, so that larger denomination coins will be of a larger size.

Use or Hybrid Coins

We discuss use according to the two main categories of use:
Fast cash-and-carry transactions
Emergency Use
We also discuss briefly the economics of hybrid coins. On top of the expenses needed to mint the digital money per se, there will be cost for manufacturing the coins. This cost may be handled by a purchase commission computed for each denomination based on the actual cost of the coin. In special cases where a coin represents the exact fair for a ride, for example, then the train or bus authority may bear the cost of the coin, so that commuters pay only the face value. The train or bus system will save on fare handling and will find it advantageous to pay the coin commission.
Use of Fast Common Cash Transactions
We discuss fast common cash transaction use according to the following topics:
denomination
shape and format
distribution
life cycle
purpose
online-offline interplay
security
power supply
coupons and non-dollar representation
acceptability

Denomination

We expect hybrid coins to first extend from regular coins, namely to be used in denominations starting from $1.00 to $10.00. These small denominations will require corresponding simple counterfeit technology, and hence the cost to be born to produce them will be small. These coins are expected to be long lasting before their virginity is tampered with because of their low denomination. Higher denominations will be gradually more and more in demand, as people get accustomed to these coins, and begin to trust them as carriers of value. One may envision hybrid coins denominated at various values up to $100, and even up to $1000. Of course, the higher the denomination, the more sophisticated the anti-counterfeit technology involved.

There are likely to be cases where a common service, like a train ride has a non-round cost, say $23.72. If the number of commuters is large, then riders will be invited to purchase coins denominated exactly for $23.72 cents, and hand them over or slip them in a payment slot in a fast flow through to the train. The train authorities will engage the mint, to issue gold coins for this particular amount. A rider who accumulated these coins and for some reason stopped using the train, could readily use these coin for any other payment need, or he or she will be able to break the virginity of the coin, and upload its contents ($23.72) to their phone or PC for regular use.

Shape and Format

Figure 4:
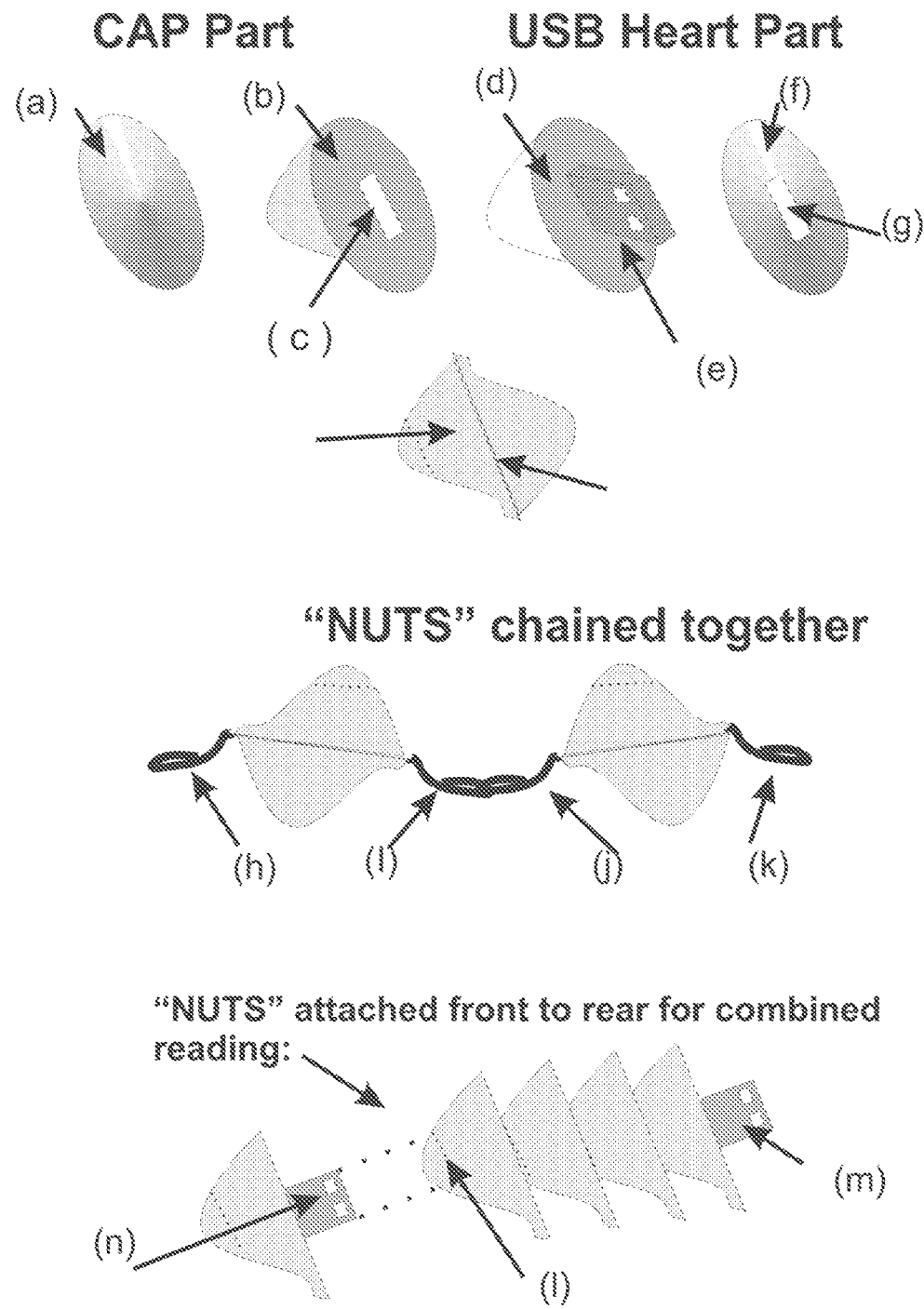
FIG. 4: This figure depicts the "nut design" for the hybrid coin. Part (a) shows the top side of the cap; part (b) shows the flat surface of the cap, and part (c) shows the slit where a USB protrusion fits. The cap-matching part (the "heart") shows its corresponding flat surface (d), the USB protrusion (e), and it opposite part (I where a USB active slit (g) is visible. The "nuts" may be chained together through loops (h,i,j,k). The "nuts" coins may be attached through "threading" the USB protrusions (n), (m), to USB female connections at the cap side of the nut. This will amount to creating the equivalent of a single hybrid coin of the same denomination as the sum of the threaded coins.
Figure 5:
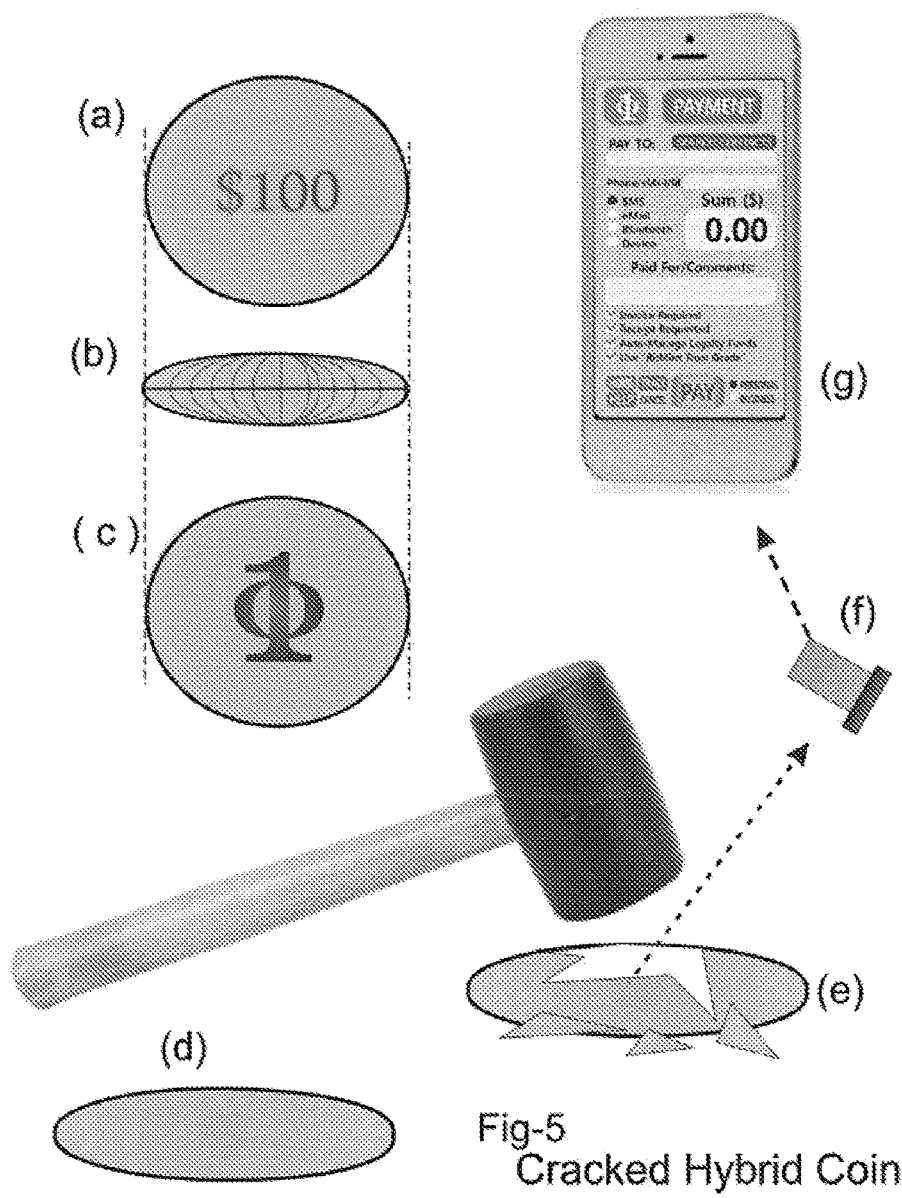
FIG. 5: Cracked Hybrid Coins: (a,b,c) are up, side, and down views of a plastic cast coin housing a micro SD (or similar) device that contains money in the form of a digital string (bit string). The coin may be constructed from composite or any other suitable material. (d) depicts such a hybrid coin subject to a hammer blow (or a nut-cracker squeeze) resulting in a cracked coin (e) where the cracking is clearly visible. The coin owner will pull the micro-SD (f) from the cracked hybrid coin, and then connect the micro SD with a phone (g) or any connectivity device to communicate with the digital mint website, validate and upload the money from the coin.
Figure 6:
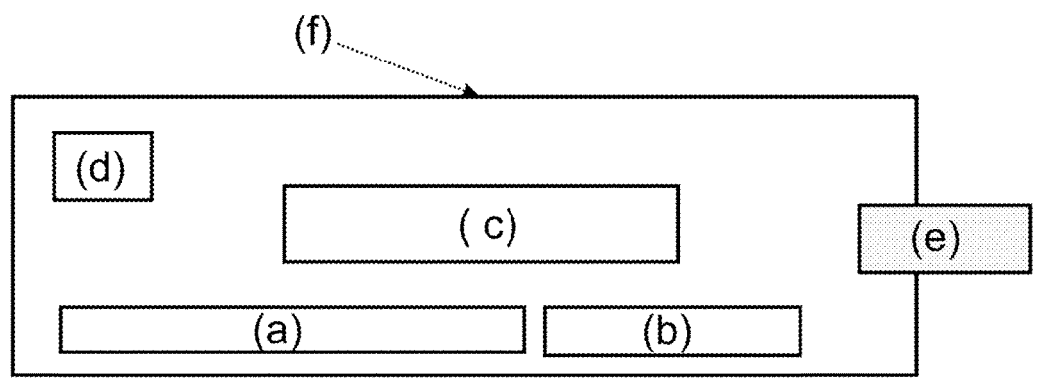
FIG. 6: Drainable Hybrid Coin (Elements): This figure shows the elements that comprise a drainable hybrid coin: it contains the money bits—bits which together reflect the monetary value of the coin; it contains additional data (meta data), (b), that is being used by the payment circuitry system (PCS), (c) to effect the drained payment; it contains the coin erasure circuitry (d) which is the security apparatus designed to wipe out the coin data (the money bits) when attempts to tamper with the coin are being detected. The coin is fitted with a payment port (e) which is a latching fixture to be latched to a corresponding payee port. Alternatively, the port may be "touch-less" using technology like NFC or BLUETOOTH to effect the payment. The various elements of the drainable coin are being enclosed in a secure enclosure (f) that is sealed, and in most cases is not designed for re-opening.

To extrapolate from present day nominal coins, one will opt for similar round shape and size, and such will be easier to accept and accommodate. But for reasons of storage, counting and otherwise, one can envision a variety of shapes and format. See for example the nut option (FIG. 4). Of particular interest are the flat, card-like coins: they will serve as an extrapolation of the familiar credit card. We have on-card flat chip technology that could accommodate the hybrid coins. Credit-card like coins will have the advantage of a large surface area that can be used for branding, for colorful text and graphics for advertising purposes, etc.

Distribution

Because hybrid coins are meant to be easily transferrable, they are naturally un-tethered to a particular owner, and if lost, anyone could find and use them. Same for theft and robbery. So much as people are reluctant to hold and be in possession of large number of cash, so they would not wish to hold a large quantity of hybrid coins. People will stuff their wallets, their glove compartment, their desk with a small amount of money in small denominations, and would probably opt for gold coins that are the easiest one to trade, and command the greatest measure of trust. Traders will get these coins in their bank; they will exchange coins in stores, and they will buy coins in automatic kiosks where they will pay with their credit card, or old fashioned cash, and receive the coins.

Life-Cycle

The hybrid coin is minted as a 'gold coin'—virgin, pristine, and it may transact indefinitely as 'gold'. At some point the gold coin is either returned to the mint for redemption, or it turns into a 'silver coin' namely a coin that has lost its virginity, and has been partially drained, which means some of its digital value has been removed from it. The silver coin may be traded as silver in which case the authenticity and the integrity of the coin is maintained by the coin valuation mechanism that keeps track over how much of the original value of the coin is still in it. For example, if a coin was minted as 'gold' in a $25.00 denomination, then after being traded as virgin, gold $25.00 coin, it is eventually 'opened' and $7.00 are paid off through the coin drainage mechanism, leaving the value of the coin at $18.00, with status 'silver'. The silver coin may be traded about for its current face value of $18.00, and the payee will trust first the mint the issued the respective gold coin, and second, the value tracking mechanism within the coin that assures the recipient payee that he indeed receives a payment of $18.00. Eventually one of four things happens: (1) the silver coin is handed back to the mint for redemption, (2) the silver coin is drained to residual value of $0.00 and discarded, (3) the silver coin is rendered into a bronze coin, namely some non-Mint source of digital money pumps digital money into it and the residual tracking mechanism reflects this. The coin can then start to drain again, or it may be redeemed at the mint, or it may be re-pumped and re-used as above indefinitely. (4) the coin is lost, abandoned, it breaks down physically either by a blow, or by a strong force, or by getting excessively wet, or by some chemical interaction, or otherwise. Please note that if the coin is stolen, it can still be used unless it has proper security feature. Regular hybrid coins are presumed to be owned by their holder.

Purpose

The main purpose for hybrid coins is the desire to conclude a simple ordinary transaction with minimum of hassle and complexity. When you pick a daily paper at the counter, it's too much to pull out your phone hit a series of buttons, or slide the screen here and there. The newspaper may cost $2.50, and you wish to be able to pull a coin from your pocket, flip it over to the seller, pick your copy and move on. A $2.50 gold coin will be perfect for this use. The anonymity that is inherent to this use is another purpose, even for more expensive deals. You want to buy books without 'big brother' watching you and profiling you based on the books your buy or the movies you watch, or the food you eat, so paying with modern cash—hybrid coins seem a suitable satisfactory solution. Hybrid coins may prove useful in an Internet cafe and otherwise for online purposes. Of course in this use the gold coin must be broken-in, and used as a reservoir of bit money. One would expect Internet Cafe operators to hold a supply of hybrid coins for customers, who may even buy them with credit card, counting on the hope that the cafe owner is not keeping tab of which coin went to which customer. A third purpose is to avoid the burden of carrying a heavy load of regular cash in your pocket. Hybrid coins may carry a large denomination on a single coin, which is not feasible with regular coins. A fourth purpose is to avoid currency exchange when you cross a national border. The bits are usable online from any place, from any location. And so even local brick and mortar stores who may not legally and conveniently accept dollars in a foreign country, will gladly accept bit representation of dollars because it is tradable all over.

A special purpose of the hybrid coin will be as a silver category over-distance payment. See below.

Online-Offline Interplay

It seems essentials to be able to shift from online mode to offline mode and vice versa in a seamless way. Using bronze coins a trader could replenish his original coin but decrease its security and therefore make the trade with the coin a bit more cumbersome as the recipient needs to verify the paid coin. Every coin may be opened, broken-into, (disrupting its virginity), and its content may be streamed into any phone, pc, or otherwise an electronic container from where this money can be used in any online application. So bronze coin trading allows for a back and forth flow of bits without any limitation. When trade is limited to gold and silver coins then the flow of hybrid coin money is only one way: towards the online use.

Security

Security of gold coins may be assured by simple visual inspection, or by use of some authentication technology to be applied to the coin. Coins of low denominations will be inspected quickly and visually, but coins of high denominations might attract more scrutiny, and the payee may wish to use a verifier device before he or she is convinced of the gold status of the coin. Silver coins may be trusted by the coin declaring itself silver and proclaiming the value of the residual money in it. But one might expect some payee being extra cautious, especially for coins of large denominations: they will wish to authenticate the coin contents at the mint. To do that they will have to connect the silver coin to a phone or a PC. Of course "live hybrid coins" that are continuously connected to the mint are an easier option.

Power Supply

Gold coins may not require any power supply, but silver and bronze coins may be needing a power source to operate. The power may be coming partly from an outside source to which the coin is connected. In that case the silver and bronze coins will be blind—showing no indication as to how much money is left and even not as to their status, silver or bronze. They will have all that data in their 'blind memory' and when connected to a phone a PC or any other well powered computing device their data will be read and displayed on the connecting device. Otherwise silver and bronze coins may operate with a battery that would power the computation needed for it status determination (silver or bronze) and for computing its residual digital money. Power is also needed to display the residual money value and its status. The battery that supplies this power may be built in, and its power rated to be sufficient for the expected life time of the coin. If the built-in battery dies, the coin can be returned to the mint for replacement. Otherwise the battery may be snapped in and out, and easily replaced.

Coupons and Non-Dollar Representation

The hybrid coins may be issued to represent value other than US dollar or other national currency. Much as digital money may reflect any valuable, so is the case for hybrid coins. So hybrid coins may represent discount money in selected store, or money that is tied for a purpose, say food. One might find the coin-like appearance of the hybrid coin more appealing than the traditional cards or printed rolls of paper.

Acceptability

Acceptability of hybrid coins will probably be tied to the acceptability of the underlying digital money, and will be much appreciated as an extension thereto.

Over-Distance Payment Use Options:

Silver coins fitted with over-distance payment options may find a variety of important use cases. Over-distance payment may be carried out via NFC, BLUETOOTH, IR, or any other electromagnetic radiation regimen. Payment will be possible as an alternative to physical hook-up or swipe option, but also for new uses. For example an over-distance silver coin could replace today 'Easy-Pass'—the payment devices that are attached to the windshield and communicate with road-side or road-top readers to accomplish a toll payment for a tall road, for example. A silver coin will use the over-distance technology to actually send over the money owed, as a cash transfer, instead of accounting data for a future payment. Drivers would like this, because these silver coins can be purchased everywhere, and because drivers would be able to make a payment but maintain their anonymity.

Movie goers will be able to put in their shirt pocket an over-distance payment silver coin, and never stand in line to buy a ticket, but rather walk directly to the theatre, a door-placed reader will extract the ticket amount as they walk in.

In a restaurant a diner will place a silver coin on the table, and the waiter will point to it a hand held payment extractor, and get paid.

Parking may be paid by simply displaying the silver coin on the dashboard. Every parking stop will have a distant money reader instead of the old fashioned money collector.

A special case of over distance payment refers to internet live, or phone connection, which allows for coin verification in real time, and long distance coin payment.

Hybrid Coins Use in Emergency Payment Circumstances

We consider two categories of emergencies:

networks emergency liquidity emergency

The former refers to a situation where the global or zone connectivity is disrupted, the cloud collapses, connection with the mint or its agencies is broken, and normal network enabled communication are not feasible. The latter case refers to a crisis or a disaster situation where the banks are dysfunctional, people cannot retrieve and activate their money assets, and the area is hard hit by an earthquake a powerful storm, flood, or snowfall, or perhaps a terrorist act. Areas of urban populations present a big challenge to the rescue operation and a lot depends on mutual help. Yet, one cannot expect a gas station owner to pump gas to his customers and rely on them showing up to pay for the gas when the flood is over. Cash money activates the community and allows for useful trade to help resolve the situation.

Networks emergency can clearly be helped by trading gold coins, but also by trading silver coins where the coin is battery operated, and so is the recipient of the money bits, if they are transferred to him or her. One prepares for such emergency with plenty of stored batteries.

Liquidity emergency may be handled by the disaster management authority (DMA) by distributing gold hybrid coins to the suffering population. A proper distribution of denomination previously prepared by the DMA will greatly alleviate the situation. People will then be able to trade these coin in a silver status, using the accompanied supply of batteries. This situation calls for preparation of active digital coins to be so distributed. Another, more sophisticated way to handle payment regimen in a crisis situation is to use hybrid coins of crisis money. Crisis money is money that comes alive when a disaster happens, and it fades away after the disaster is over.

Hybrid Coins for Crisis Money:

Payment requirement in a crisis situation may be handled by using ephemeral money. Ephemeral money is money that appears at a given moment—out of thin air, and at a subsequent moment it vanishes into complete disappearance. Between this birth and death points the money is active, traceable and satisfies a requirement set upon it. In general ephemeral money may vanish in a way that its holder is simply losing it. In that case the purpose of the ephemeral money is to effect some lasting changes during its live time, but the trade is such that whoever is left with it at its vanishing point, is losing its value without compensation. Such ephemeral money is used in money games and game-trades designed for digital money. But for crisis management the planned ephemeral money will be traded against some form of lasting money so that the holder of ephemeral money will end up with an equivalent or corresponding amount of durable, and lasting money.

Ephemeral money may be traded in a form of digital money prepared in hybrid coins which may or may not be distributed ahead of time. Unlike nominal money, ephemeral money is of no value until the proper authority announces its "birth". So unlike regular money the people who receive it to prepare for a pending crisis cannot use it before its birth date, and so it will be available to them when the crisis hits. If the ephemeral money in hybrid coins is distributed through a proper range of denominations with a proper amount of coins then the coins can be traded as 'gold' which is the least time consuming under the duress of the crisis. Otherwise, using battery operated devices, if necessary, the people affected by the crisis will be using silver coins for their trade.

When the crisis is over the ephemeral money may be traded against nominal money under some exchange protocol. This is important for the people to be willing to accept the ephemeral money. The crisis management authority may deduct the value of the originally distributed ephemeral money from any amount of ephemeral money that people will submit for redemption. If people in the crisis zone will end up with less money than they were given then per an authoritative decision, either the shortfall will be forgiven or it will become debt to the government. Either way the ephemeral money will relieve the banks from the requirement to struggle to remain open despite the crisis, and at the same time it will allow the many strangers in the disaster zone to cooperate and collaborate in ways that would encourage many to work their hardest, and be recognize for their efforts.

Hybrid Coin Options

The basic hybrid coin is comprised of a physical enclosure, capsule, in which a digital coin is placed, recorded on any bit-recording media.

We distinguish between two categories of hybrid coins:

Crackable

Drainable

Crackable coin is built to be cracked open, allowing the digital media where the coin is written to be exposed and used for the coin's full value. A drainable coin is designed to be drained bit-wise, and pay off directly from the coin at any given rate, driven by time or by events. A crackable coin is designed to be paid in full, (passed from payer to payee in tact), a drainable coin is designed as a one-way wallet, paying any required sum, up to the contents of the wallet.

Crackable Coins

Crackable coins may be featured in forms reminiscent of the traditional coin, and in forms shaped by artistic input in order to impart a sense of beauty. The shape of a coin may be reflective of its value, same for its colors and size. Coins can be fitted on a decorative structure to effect a cash gift with a sense of beauty and celebration. Coins may have a handling ears attached to them so that they can be strung together. They may be made to dove-tail fit into each other. A round colorful coin may be placed in the center of a flower head made out of decorative material, so that one can give "flowers" as gifts, which amounts to cash. Cracked coins may be fitted with a pre-recorded message by the giver for the recipient.

Crackable coins can be manufactured in two stages: (i) dead coin, and (ii) live coin. The dead coin will be comprised of a string of random bits written on some electronic media, and housed in the physical coin. The physical coin is imprinted with an identification code (an Id), but the contraption is not money, it is simply a well-housed string of random bits. This will allow a manufacturer of a hybrid coin to be focused on (i) securing high quality random bits, and on (ii) constructing an effective physical coin of the right shape, fabric, weight, size etc.

The dead coin may also serve as a randomness capsule for any purpose randomness may be used for (see below). Such dead coins can be activated, by some front mint. We will regard the entity that manufactures the dead coin as the core mint, which will deliver the dead coin to the front mint which will activate it by passing it on to its customer (a trader) against a sum $x, and then record in its book that the coin of the indicated id was sold to a trader. There are two options, either the image of the randomized bits within the coin are passed to the front mint, or they are not. If they are passed, then the front mint will have the image and the id of the coin, and when anyone submits the coin for redemption, the front mint will verify that the identified bits are all right per that coin Id, and if so, pay off the coin. To submit a coin for redemption the submitting trader will have to crack it, upload its bit contents to the network and submit it to the mint. If the coin image is not passed to the front mint then the core mint will have to be given the redemption data and approve or disapprove the submission.

If the coin value is based on the count of its bits, then it is possible for one to crack the coin, then upload the coin bits to a computer, then to chop off any number of bits and assign them a value which is a straight proportion of the total value of the coin. The chopped off bits could be paid electronically or be redeemed by the front mint.

The core mint may manufacture its dead coins according to the specific order of the front mint, as to id, size, color, shape, or with any of the other higher level security features mentioned herein.

The dead coins may be manufactured in a standard fashion, namely they will all have the same number of coin bits, (say t bits). The front mint will assign each such coin (comprised of t value bits) its trade value. If the coin is set up to be cracked and then have its bit contents traded electronically base on its bit count then, the coin Id will have to include its characteristic value-per-bit parameter. So a coin of a standard 1 million bits when traded at a par value of, say 10$, will operate with a bit value of 100,000 bits per 1US$. The next 1 million randomized bit coin may be traded as 1000$, and in the case the bit value will be 1000 bits per dollar. Once this bit value is indicated, then both the payer and the payee will know how to par out any sum lesser than the value. For example a transaction of $2.00 will include transfer of 200,000 bits in the first instance, and transfer of 2000 bits in the second instance. Of course, all this transferring occurs after the coin is cracked and the value bits are extracted from the physical coin.

The Front mint will be able to maintain a fixed $/bit value, and in that case the number of value bits, v, will be determined by the denomination of the coin. As long as v<=t the coin will simply designate the starting bit, s, and the ending bit, e such that (e-s=v), and the rest of the t-v bits will be ignored.

Tethered Hybrid Coins:

Hybrid coins may be tethered in many ways.

Tethering a hybrid coin to a given group: The manufacturer of the coin may assign the coin to be tradable within a well defined group, and only a member of that group will have the right to redeem it.

Randomness Capsule

A randomness capsule is a dead coin comprised of some r randomized bits enclosed in a physical enclosure, as is the case for a dead coin, described above. Only that the randomness capsule is not a coin, it is a container of a particular image of random bits, marked with a given Id. Such capsule can be used anywhere randomness is in use.

For example, one could buy two identical capsules, send one such capsule to a friend, using regular mail, say, and then the two will use that randomness to carve out shared cryptographic keys and the like. Or alternatively, Alice will buy a random capsule in a store, then pass its id to Bob, or contact the core mint (now acting as a randomness capsule manufacturer) and request an identical capsule to be sent to Bob. If Bob gets the capsule physically intact he is quite assured that its contents was not seen by a hacker, and only he, Alice and the Mint have the randomness image.

Operation Suit Upload

The electronic media within a crackable coin may include more than the digital coin per se. It may include operational software such that when uploaded to a phone, for example, it will install there the application that is designed to handle the money of the coin. The uploaded media may include a suit of applications for money management. By doling out attractive physical coin with a nominal value, it would be possible to induce traders to install the operational software for that mint onto their phones.

Loyalty Money

Crackable coins are very well suited for loyalty money applications. These coins may be hidden in boxes of products of a given store, and the money within may be tethered to that store. Store managers could hand off decorative coins to pacify irate customers who were mistreated, or wait too long in line etc. The tangibility and the beauty of the coins will have a special effect.

Drainable Coins

Drainable coins are designed to 'spit out' one bit at a time and that way exercise payment to the entity that receives the bits, which may be another trader or the entity that sold the bits. The payment involves emitting the bit from the drainable coin, and forgetting (discarding) that bit. Such bit draining can occur on a time basis (like when paying for parking), or on event basis, (say, upon receiving a measure of electrical charge). The hardware will insure (using common means) that the emerging bits are erased from the bit stock in the coin.

The drained coin will also have an id, which will be marked without and within. So any payment session based on such draining will start by the coin notifying the payee what is its Id.

Drainable coins may be controlled by a combination of events, circumstances and time. So one can receive a drainable coin wired to emit ('spit out') no more than $50 a day for 100 days (so the coin initially is valued as $5000). And this $50 is to be paid per pages read on the Internet, per browsing time, etc. A tethered coin will not release its bits to a recipient it was not programmed for.

Such drainable coins will have to withstand a fraudulent attempt to crack them, release all the money (in the above example the full $5000), and use that money for any purpose. This will require some technology for a secure enclosure. Such coins may be engineered with a proper draining port to facilitate the payment. The specially shaped draining port will have to fit the payment port of the intended payee.

Draining Port

A USB stick is an example for an effective bit transfer between a male and a female pair of counter ports. For the drainable coin we may wish to eliminate any bit stream to the coin, and effect only an egress of bits to the payee port. Different payees may be fitted with a unique geometry of a port (male or female) so that the counter port that fits it will be the only possibility for payment to take place. This will eliminate errors and fraud and insure that each coin is paying only for what it was designed to pay.

Secure Enclosure

There are various methods to be designed to secure the money enclosure (the hybrid coin). They are based on volatility of the coin bearing media, such that when at attempt to breach its integrity is detected, the money information inside the coin is instantly erased (the coin data disappears).

The question is how to detect whichever way one may try to crack the coin. A simple way is to trigger the erasure of the coin by an electronic circle based on light. Another is pressure based, and the most secure is based on radiation absorption.

Use of Secure Enclosure Drainable Coins

Secure Enclosure Drainable Coins (SED-coins) are characterized by having both the digital money as a randomized bit series, or in equivalent form, and payment control circuitry (PCS). The PCS insures that the coin is drained as agreed upon in the payment arrangement.

The key idea here is that payment conditions (tethering) which nominally would be recorded in the mint, can this way be recorded in the secure physical coin—either as in addition to the mint recording or in lieu of it.

For example, a government support money for people in distress may be given through an SED coin delivered physically to the recipient, and containing financial support for a prolonged time, say, several months. The money giver intends to allow for that support to be doled out at a given measured daily rate. The PCS will be hard programmed to effect this restriction so that not more than the allotted daily expenditure can be spent. This will insure that the support lasts for the intended period, and is not spent in a splurge over a short time.

The PCS could also be programmed to recognize an id-type given to it from the payee to check that it is a qualified recipient.

It is expected that the holder of such a slow dispensing coin will be most eager to break in, and make use of the bulk of money inside right away, and that's where the security measures will be tested.

For an implementation where the money dispensed from the SED coin is untethered the incentive to crack the coin is greater, since all the money within translates directly to cash, and there is nothing in the mint that will prevent that money from redemption. So fraud-resistance depends on the integrity of the physical coin.

The incentive to crack the SED coin is of course proportional to the value it carries. Since it is being envisioned that the SED coin will be an efficient way for support agencies to exercise their support effectively and without frequent laborious contact, there will be a pressure to offer very high denominations digital coins so no more human attention will be needed to insure the money is well spent (at the intended pace)—technology will so guarantee.

Some use cases, call for an SED coin to be impressed with the identity of the rightful owner (especially for high denominations drainable coins). The rightful owner will have to use it in person, latching the coin through its port into the fitting port of the payee. Such ports can be made unique so that only a rightful (intended) payee will be able to extract money bits from the SED coin. The payee will verify that the SED coin carries the name or the image of the person trying to use it. Biometrics may also be used. The payer will have a fingerprint cushion to lay his thumb upon, as he or she presents himself or herself before the payee. Such measures will be economically justified for high denomination coins.

Methods of Securing the Coin Enclosure

The basic idea is to carry the coin data (bit identities) in a volatile format, readily erasable. This can be done by activating a securely built-in battery that either works at low energy all the time, keeping the information alive, and is cut off when a break-in effort is being detected. Or the battery is activated when a breach attempt is being detected, and wipes out the value bits in one of the commonly used ways.

The challenge is to detect whatever method is used to pry open the coin. Since the efforts to break the coin are likely to be commensurate with the minted, or remaining value of the coin, a corresponding investment in security measures is called for.

The erasure circuitry could be activated by light, since the coin is locked into an internal darkness. The light will trigger the erasure mechanism. Alas, fraudsters could pry open the coin by doing so in the darkness—if they know that security is based on light.

The other way may be based on capturing a non-atmospheric pressure in the internal sealed volume of the coin. If the coin is pried open, the pressure inside becomes atmospheric, right away, and this change triggers the wipe-out mechanism. This has the advantage in as much as the attacker may not be aware of the randomized pressure used to protect the coin, so he can't (easily at least) place the coin in an external pressure of the same value (over or under atmospheric as the case may be), and the pressure gap between the inside of the coin, and the outside which will be exposed as the coin is tampered with, will quickly dissipate as the pressure inside the coin equalizes with the pressure outside, and this change of pressure triggers the erasure mechanism. The hacker could drill first a small hole resisting a quick pressure equalizer. The "drill" will measure the pressure inside the coin, and then will adjust the external "hood" pressure to allow complete opening of the coin.

Another method is to set up a constant electro magnetic radiation circuitry that is fixed up to erase the data when the absorption of the gaseous environment in the coin changes above a given threshold. The hacker will be hard pressed to guess the randomized proportion of gases used in the SED coin. Each combination of gases will have to be fitted with a corresponding wave length of radiation bandwidth.

SED Construction

The SED coin is comprised of the money bits and the meta bits that accompany the money bits, and the circuitry that controls the payment according to pre-defined terms. The circuitry (PCS) includes a clock to insure time based payment terms, and any other terms. The money bits, the meta bits and the PCS are enclosed in an enclosure that is sealed. The seal may be designed for some eventual procedural opening, but in most cases it would be a seal that is not designed for re-opening. That means that one will have to break, cut, drill the enclosure to reach into its content. And hence the enclosure will be linked to a data erasure mechanism (any commonly used mechanism will do) that will be triggered when the seal is tampered with. The erasure mechanism may be any combination of the above identified methods. The built in randomness (as to pressure or vacuum rating, or gas composition), will pose a formidable challenge to the attacker.

Drainable coins may make payments with untethered money as well as with tethered money. This refers to tethering (restricting) money at the mint level where redemption is exercised only if any valid tethering terms are satisfied. However, the drainable coin may shift some tethering functions to the coin itself. The physical hybrid coin will have circuitry built in (PCS) that will insure that the prescribed tethering terms are satisfied. Thus, for example, the coin will have to be activated by an activation code that is input to it via some key pad or a similar input device. Or the coin will be equipped with biometric protection, say a fingerprint.

The coin may be issued to a particular person and be replaceable upon loss or theft. The owner will notify the mint, and have a replacement coin shipped to him or her, while the lost or stolen coin will be voided. If the loss or theft occurred when part of the coin money has been drained, then only the remainder will be replaced. This practice may be limited to some reasonable number of times, to foil any repeating attempts to crack the coin, and upon failure, request a replacement.

Such coin built-in tethering may take some load off the mint. Namely, from the mint perspective the money is free from any tethering. All payment terms are exercised within the tamper-resistant drainable coin.

Encoding

Describing the "Dual Bits" encoding (DBE): a digital coin may be comprised of money value bits (MVB), and any other data, (meta data), like mint identification, coin-identification, payment terms, coin history, cryptographic keys, etc. One may distinguish between the MVB and the non-MVB in the following way:

MVB: encode "0" as "00"; encode "1" as "11"
Non-MVB: encode "0" as "01"; encode "1" as "10"

This will allow any meta data to be encoded in any way expressible in bits, ands will eliminate any confusion between the MVB and the non-MVB. DBE will double the size of the bit size of coin as the price of this distinction.

Example: a coin is expressed through 7 value bits randomized to: 1001101, and is 'embraced' with a header H=1011 and a trailer, T=0011 indicating the nature of the coin and its mint. The coin, in normal encoding will look like:

coin (bit encoding): 1011-1001101-0011

Of course, the 'dashes' don't appear in the code itself, so somewhere else it would have to be specified that the right most 4 bits, and the leftmost 4 bits represent header and trailer respectively. And if for some reason the header or the trailer will grow in size then the specification (outside the coin) will have to so indicate.

In the DBE the same coin is encoded as:

coin (dual bit encoding) 10 01 10 10-11 00 00 11 11 00 11-01 01 10 10

So that if for some reason there will be a requirement to add more information, say, to the trailer to become T'=0011000, then the coin will readily be adjusted to look as follows:

coin (dual bit encoding) new trailer: 10 01 10 10-11 00 00 11 11 00 11-01 01 10 10 01 01 01

And the recipient of the coin will readily interpret the coin as intended because the trailer bits are written in meta data encoding. This means that the payment management system will be able to dynamically add information to the paid coin through a header, a trailer, or even inside the MVB bits, if so desired, without incurring any confusion as to whether a bit is a money value bit or a meta data bit.

Summary of Specifications (1) We described here a system named "drainable digital coin" comprised of a secure enclosure, fitted with a payment port, containing (i) a digital coin payable in any desired resolution, (ii) a payment control circuitry (PCS), and (iii) tamper-resistant apparatus, that enables payment (drainage) from the drainable digital coin, according to the terms programmed into the PCS; the coin resisting attempts to compromise its integrity, and use the contained money in ways inconsistent with the prescribed terms programmed into the PCS (2) More specifically, we described here a system as in (1) where the secure enclosure is manufactured without intended means for re-opening, such that any attempt to have access to the contents of the digital coin will involve cracking, drilling, or otherwise harming the integrity of the enclosure in ways detectable by one of various detection systems placed in the coin for that purpose, like: light detection system to be activated to wipe out the coin data upon sensing light in the otherwise dark internal of the enclosure; pressure detection system that is activated by a change of the pressure in the internal volume of the enclosure; absorption detection system activated when electromagnetic radiation emitted at one point inside the enclosure, is detected in the opposite point of the enclosure, and the detection apparatus is activated when the absorption of the radiation changes above a preset threshold, as a result of a change in the gaseous composition of the space between the radiation emitter and the radiation detector, and where upon such detection, the contents of the coin is wiped out; such activations operate over the coin data which is kept in the coin in a volatile state.

(3) And also we describe here a system as in (1) where the PCS includes a preset limitation of the amount of money spent within a specified time interval, such that a digital coin of nominal value of $X, if allowed to be used for paying $y per a time interval (e.g. day, week, month), will be usable for payments for x/y time intervals.

4. A system as in (1) where the coin requires authentication of its user to be an intended payer using this coin; either as being a member of an authorized group, or as being a particular individual; such authentication may be exercised via requirement of a preset authentication code to be input via a dedicated numeric pad, or via a biometric port, and where such a coin may be tethered to its authorized users, such that if lost, or stolen, the coin issuing mint will replace it with the portion of the unused money.

What is claimed is:

1. A system for securely storing a digital coin where the value of the digital coin is based on the count of its bits and where payment with the digital coin is provided by emitting bits from the system one bit at a time, comprising:
   a secure enclosure, fitted with a payment port that emits bits from the digital coin;
   a memory contained within the secure enclosure that stores the digital coin;
   payment control circuitry (PCS) contained within the secure enclosure that controls payment from the digital coin by removing one or more bits from the digital coin in the memory and emitting the one or more bits through the payment port one bit at a time; and
   a tamper-resistant apparatus contained within the secure enclosure that resists attempts to compromise the secure enclosure by including within the secure enclosure one or more of
      a light detection system that erases the digital coin from the memory upon sensing light in the otherwise dark internal of the secure enclosure,
      a pressure detection system that erases the digital coin from the memory upon sensing a change of the pressure in the internal volume of the secure enclosure, and
      an absorption detection system that erases the digital coin from the memory upon detecting with a radiation detector a change in the absorption of radiation emitted by a radiation emitter above a threshold level, wherein a change in the absorption of radiation emitted by the radiation emitter is a result of a change in the gaseous composition of the space between the radiation emitter and the radiation detector.

2. The system of claim 1, wherein the PCS includes a preset limitation of the amount of money spent within a specified time interval, in the form of the digital coin of nominal value of X, if allowed to be used for paying y per a time interval (day, week, month), is usable for payments for x/y time intervals.

3. The system of claim 1, wherein the digital coin requires authentication of its user to be an intended payer using this digital coin; either as being a member of an authorized group, or as being a particular individual; such authentication is exercised via requirement of a preset authentication code input via a dedicated numeric pad, or via a biometric port, and wherein such a digital coin is tethered to its authorized users, such that if lost, or stolen, the digital coin issuing mint it replaces the digital coin with the portion of the unused money.

\* \* \* \* \*